US011258915B2

(12) United States Patent
Beppu

(10) Patent No.: US 11,258,915 B2
(45) Date of Patent: Feb. 22, 2022

(54) READING APPARATUS AND READING CONTROL METHOD

(71) Applicant: Seiko Epson Corporation, Tokyo (JP)

(72) Inventor: Wataru Beppu, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/005,492

(22) Filed: Aug. 28, 2020

(65) Prior Publication Data

US 2021/0067651 A1    Mar. 4, 2021

(30) Foreign Application Priority Data

Aug. 29, 2019  (JP) .............................. JP2019-156935

(51) Int. Cl.
*H04N 1/00*   (2006.01)
*H04N 1/12*   (2006.01)
*H04N 1/21*   (2006.01)
*H04N 1/203*  (2006.01)

(52) U.S. Cl.
CPC ..... *H04N 1/00814* (2013.01); *H04N 1/00408* (2013.01); *H04N 1/00824* (2013.01); *H04N 1/00917* (2013.01); *H04N 1/121* (2013.01); *H04N 1/203* (2013.01); *H04N 1/2104* (2013.01); *H04N 2201/0081* (2013.01); *H04N 2201/0094* (2013.01)

(58) Field of Classification Search
CPC ........... H04N 1/00814; H04N 1/00917; H04N 1/2104; H04N 1/121; H04N 1/00824; H04N 1/00408; H04N 1/203; H04N 2201/0081; H04N 2201/0094; G03G 15/55; G03G 21/14

USPC ......................................... 358/474
See application file for complete search history.

(56) References Cited

U.S. PATENT DOCUMENTS

| 5,465,172 | A  | * | 11/1995 | Fukushima | ........ H04N 1/32363 |
| | | | | | 358/404 |
| 8,305,657 | B2 | * | 11/2012 | Shimizu | ............. H04N 1/00413 |
| | | | | | 358/498 |
| 10,205,839 | B2 | * | 2/2019 | Kanamitsu | ................ G06T 3/40 |
| 10,574,851 | B2 | * | 2/2020 | Yoshikaie | .............. H04N 1/047 |

(Continued)

FOREIGN PATENT DOCUMENTS

JP    2017085452 A    5/2017

*Primary Examiner* — Negussie Worku
(74) *Attorney, Agent, or Firm* — Chip Law Group

(57) ABSTRACT

A reading apparatus includes a transport unit, a multi-feed detection unit, a reading unit, and a controller. When a multi-feed of the document is detected by the multi-feed detection unit, the controller multi-feeds causes the transport unit to discharge, downstream of the transport path, a multi-fed document for which the multi-feed is detected and then temporarily stops the transport, stores multi-fed page information indicating a page number of the multi-fed document, restarts the transport after the temporary stop, and after the reading unit reads a remaining document whose page succeeds a page of the multi-fed document, performs a re-reading process including the transporting and the reading of the multi-fed document, respectively, and inserts, based on the multi-fed page information, second read data acquired by the reading in the re-reading process into first read data acquired by the reading completed before the re-reading process.

7 Claims, 6 Drawing Sheets

(56) References Cited

U.S. PATENT DOCUMENTS

| | | | |
|---|---|---|---|
| 10,574,855 B2* | 2/2020 | Yokoyama | H04N 1/32776 |
| 2007/0127087 A1* | 6/2007 | Nabemoto | H04N 1/2032 |
| | | | 358/468 |
| 2009/0310194 A1* | 12/2009 | Shimizu | H04N 1/00962 |
| | | | 358/498 |
| 2013/0057888 A1* | 3/2013 | Dohi | H04N 1/00278 |
| | | | 358/1.13 |
| 2016/0127571 A1* | 5/2016 | Kamisoyama | G06K 9/00469 |
| | | | 358/488 |
| 2017/0126911 A1* | 5/2017 | Kogi | H04N 1/00037 |
| 2017/0126914 A1* | 5/2017 | Koyanagi | H04N 1/00745 |
| 2018/0198943 A1* | 7/2018 | Yoshikaie | H04N 1/00588 |
| 2019/0098165 A1* | 3/2019 | Mokuo | H04N 1/1008 |
| 2020/0195800 A1* | 6/2020 | Takase | H04N 1/00779 |

* cited by examiner

READING APPARATUS AND READING CONTROL METHOD

The present application is based on, and claims priority from JP Application Serial Number 2019-156935, filed Aug. 29, 2019, the disclosure of which is hereby incorporated by reference herein in its entirety.

BACKGROUND

1. Technical Field

The present disclosure relates to a reading apparatus configured to transport and read a document and a reading control method.

2. Related Art

When a plurality of documents to be read is placed on a document tray, the scanner draws the documents one by one into a transport path and transports the documents. In rare cases, the reading apparatus may simultaneously transport a plurality of overlapped documents. Transporting a single document is referred to as a single-feed, and transporting a plurality of overlapped documents is referred to as a multi-feed.

A configuration is disclosed in which when a multi-feed of a document is detected by the multi-feed sensor, the transporting of the document and the reading of the document by the reading unit are stopped (see JP-A-2017-85452).

With the configuration in which the document transport is stopped when the multi-feed of the document is detected, the user can check, on the spot, the document for which the multi-feed is detected, and can set the transported documents including the multi-fed document again on the document tray to determine whether to perform scanning again. However, since the transport of the remaining documents on the document tray is stopped, the efficiency of the entire reading process for a plurality of documents is reduced.

On the other hand, under the setting that the transport is not stopped until the transport of all the documents in the document tray is completed even when the multi-feed of documents is detected, the transport is not stopped even when a plurality of overlapped documents is actually transported. In such a case, after all the documents have been transported and discharged to the paper discharge tray or the like, the user is required to search for some documents that were not read due to the multi-feed and scan them again, so that the burden on the user to obtain a correct reading result is heavy. As described above, in the related art, there is room for improvement in terms of streamlining the reading process and burdening the user to obtain a correct reading result.

SUMMARY

The reading apparatus includes a transport unit that transports a document along a transport path, a multi-feed detection unit that detects a multi-feed of the document being transported by the transport unit, a reading unit that reads the document being transported by the transport unit, and a controller that controls the transport unit and the reading unit, wherein when the multi-feed of the document is detected by the multi-feed detection unit, the controller causes the transport unit to discharge, downstream of the transport path, the document for which the multi-feed is detected and then causes the transport unit to temporarily stop the transport, stores multi-fed page information indicating a page number of the document for which the multi-feed is detected, causes the transport unit to restart the transport after the temporary stop, and after the reading unit reads a remaining document whose page succeeds a page of the document for which the multi-feed is detected, causes the transport unit and the reading unit to perform a re-reading process including the transporting and the reading of the multi-fed document, respectively, and inserts, based on the multi-fed page information, second read data acquired by the reading in the re-reading process into first read data acquired by the reading completed before the re-reading process.

DESCRIPTION OF EXEMPLARY EMBODIMENTS

Hereinafter, embodiments of the present disclosure will be described with reference to the drawings. The drawings are only an example for describing the embodiments. Since the drawings are an example, the ratio or shape may not be accurate, or they may not be in agreement with each other or may be partially omitted.

1. Device Configuration

Figure 1:
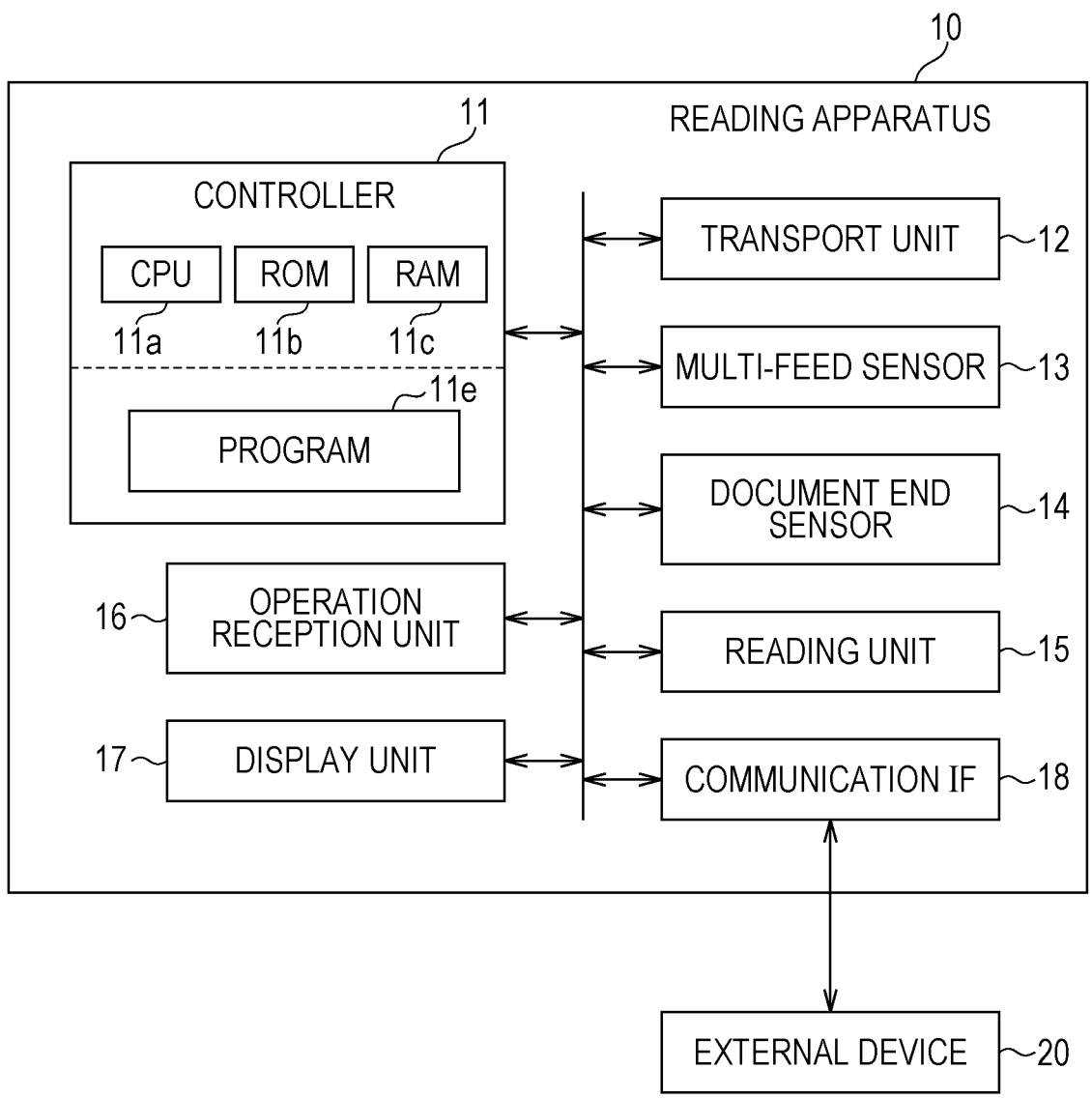
FIG. 1 is a block diagram showing a schematic configuration of a reading apparatus.

FIG. 1 schematically shows a configuration of a reading apparatus 10 according to the present embodiment. The reading apparatus 10 is a scanner capable of reading a printed document. The reading apparatus 10 performs a reading control method. The reading apparatus 10 includes a controller 11, a transport unit 12, a multi-feed sensor 13, a document end sensor 14, a reading unit 15, an operation reception unit 16, a display unit 17, and a communication interface 18. The interface is abbreviated as an IF. The controller 11 includes, for example, a CPU 11a as a processor, a memory such as a ROM 11b and a RAM 11c, and other storage means, and controls respective units of the reading apparatus 10 according to a program 11e stored in the memory. The processor constituting the controller 11 is not limited to one CPU, and may be configured to execute processing by a plurality of CPUs or a hardware circuit such as an application specific integrated circuit (ASIC), or may be a configuration in which the CPU and the hardware circuit cooperate to execute processing.

The transport unit 12 transports the document from upstream to downstream of the transport path under the control of the controller 11. The direction from upstream to downstream of the transport path may be referred to as a transport direction. Upstream and downstream of the transport path are also simply referred to as upstream and downstream. The document is typically a paper medium, but may be a sheet-like medium made of a material other than paper. The transport unit 12 includes a plurality of rollers for transporting a document, and a motor that applies power to the rollers, and rotates the rollers.

The reading unit 15 is a mechanism for optically reading a document under the control of the controller 11. The reading unit 15 includes a light source that irradiates a document, an image sensor that outputs charges according to the transmitted light or reflected light from the document, an optical system for guiding light to the image sensor and the like. The document being transported by the transport unit 12 is read by the reading unit 15. Therefore, the reading apparatus 10 corresponds to a sheet feed scanner. At least part of the transport unit 12 may be referred to as an automatic paper feeding device or an auto document feeder (ADF).

The multi-feed sensor 13 is a sensor that detects the multi-feed of a document. The document end sensor 14 is a sensor that detects the presence or absence of a document. The operation reception unit 16 is a unit that receives an operation from a user, and is, for example, a physical button or a touch panel. The display unit 17 is a unit that displays visual information, and is constituted by, for example, a liquid crystal display or an organic EL display. Of course, the touch panel may be implemented as one function of the display unit 17.

The communication IF 18 is a general term for one or a plurality of IFs for allowing the reading apparatus 10 to perform wired or wireless communication with the outside in accordance with a predetermined communication protocol including a known communication standard. In the example of FIG. 1, the reading apparatus 10 is communicably connected to an external device 20 via the communication IF 18. The external device 20 is, for example, a personal computer (PC), a server, a smartphone, a tablet terminal, or the like. The reading apparatus 10 may be a multifunction machine having a plurality of functions such as a print function, a facsimile communication function, and an e-mail communication function in addition to the function as a scanner.

Figure 2:
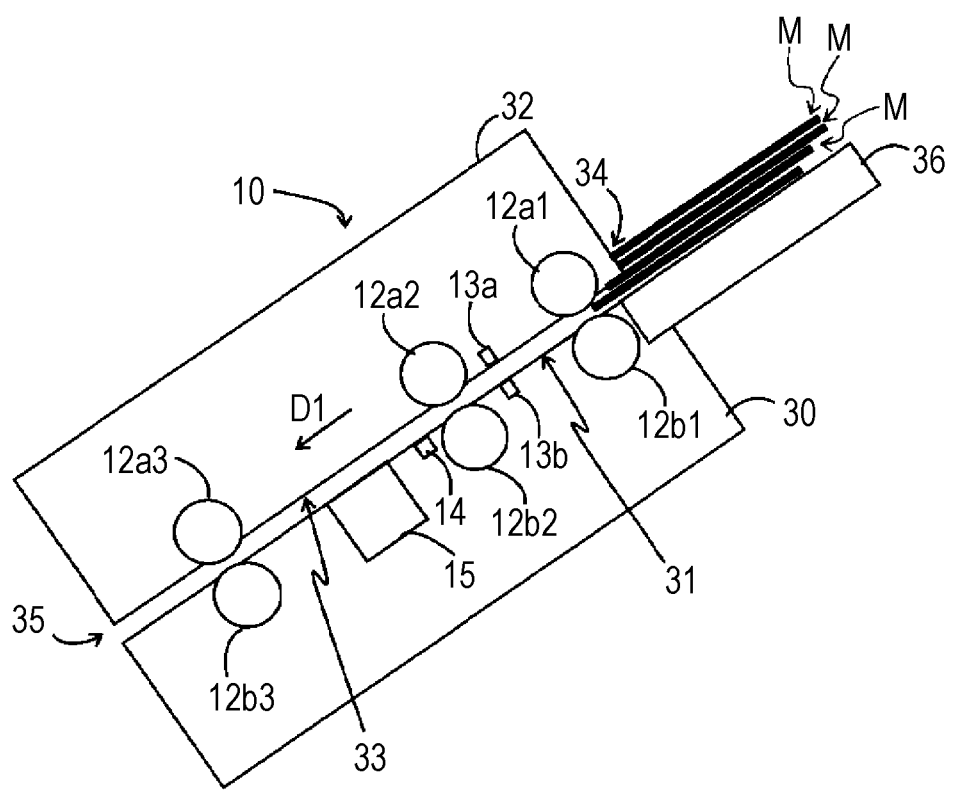
FIG. 2 is a diagram simply showing a mechanical structure of a reading apparatus including a transport path.

FIG. 2 schematically shows the mechanical structure of the reading apparatus 10 including a transport path 33. As shown in FIG. 2, the reading apparatus 10 includes a main body 30 and a lid 32 that covers an upper face 31 of the main body 30. The lid 32 can be opened/closed with respect to the main body 30. The transport path 33 through which the transport unit 12 transports a document M is provided between the main body 30 and the lid 32. The transport unit 12 takes the document M from an upstream supply port 34 into the transport path 33. In addition, the transport unit 12 discharges the document M from a discharge port 35 downstream of the transport path 33 to the outside of the reading apparatus 10. Reference symbol D1 indicates a transport direction D1. Note that at least part of the transport path 33 may be curved.

In the vicinity of the supply port 34, a document tray 36 on which the document M to be read is placed is provided. The document tray 36 extends further upstream of the supply port 34. The document tray 36 has, upstream of the upper face 31, a surface continuous with the upper face 31 of the main body 30. The document tray 36 may be referred to as a document support unit, a document placement unit, or the like.

The reading unit 15 is housed inside the main body 30. In the example of FIG. 2, the reading unit 15 reads a surface of the document M transported along the transport path 33 by the transport unit 12, where the surface faces the upper face 31 of the main body 30. However, the reading apparatus 10 may have a configuration in which a reading unit is further provided at a position where a surface, facing the lid 32, of the document M transported along the transport path 33 by the transport unit 12 can be read. That is, the reading apparatus 10 may be a scanner that can simultaneously read both surfaces of the document M.

FIG. 2 shows some pairs of rollers that face each other across the transport path 33 as the rollers that constitute part of the transport unit 12. A roller pair formed by a roller 12a1 and a roller 12b1 is referred to as a first roller pair 12a1, 12b1. A roller pair formed by a roller 12a2 and a roller 12b2 is referred to as a second roller pair 12a2, 12b2. A roller pair including a roller 12a3 and a roller 12b3 is referred to as a third roller pair 12a3, 12b3. The rollers 12a1, 12a2, and 12a3 are disposed on the lid 32, and the rollers 12b1, 12b2, and 12b3 are disposed on the main body 30. Each roller pair transports the document M by pinching the document M between the rollers constituting the pair and rotating it.

The most upstream first roller pair 12a1, 12b1 among the roller pairs shown in FIG. 2 is disposed at a position slightly downstream of the supply port 34. The first roller pair 12a1, 12b1 takes one document M from the bundle of a plurality of documents M placed on the document tray 36 into the transport path 33 and transports the taken document M downstream. That is, the first roller pair 12a1, 12b1 ideally performs a single-feed. However, the first roller pair 12a1, 12b1 may take two or more documents M into the transport path 33 at the same time.

The second roller pair 12a2, 12b2 located downstream of the first roller pair 12a1, 12b1 and upstream of the reading unit 15 transports the document M transported by the first roller pair 12a1, 12b1 further downstream. When the document M transported by the second roller pair 12a2, 12b2 passes through the position of the reading unit 15 in the transport path 33, the document M is read by the reading unit 15. The most downstream third roller pair 12a3, 12b3 among the roller pairs shown in FIG. 2 is disposed downstream of the reading unit 15. The third roller pair 12a3, 12b3 transports the document M transported by the second roller pair 12a2, 12b2 further downstream, and discharges the transported document M to the outside through the discharge port 35.

In the example of FIG. 2, the multi-feed sensor 13 is provided at a position downstream of the first roller pair 12a1, 12b1 and upstream of the second roller pair 12a2, 12b2. The multi-feed sensor 13 is, for example, an ultrasonic sensor, and includes a transmitter 13a that transmits ultrasonic waves and a receiver 13b that receives the ultrasonic waves transmitted by the transmitter 13a. The transmitter 13a and the receiver 13b are disposed at positions facing each other with the transport path 33 interposed therebetween. The multi-feed sensor 13 detects the multi-feed using the principle that the ultrasonic wave from the transmitter 13a is attenuated when passing through the document M. The degree of attenuation of the ultrasonic wave when passing through the multi-fed documents M is greater than the degree of attenuation of the ultrasonic wave when passing through the single-fed document M. For this reason, when the detection signal output by the receiver 13b according to the received ultrasonic wave falls below a predetermined threshold value for the multi-feed detection, the multi-feed is detected, and when the detection signal is equal to or greater than the threshold value, the single-feed can be detected.

In the example of FIG. 2, the document end sensor 14 is disposed at a position downstream of the second roller pair 12a2, 12b2 and upstream of the reading unit 15. The document end sensor 14 detects the presence or absence of a document. Specifically, when a state in which the document does not exist is switched to a state in which the document exists, that is, when the leading end of the document M reaches the position of the document end sensor 14, the document end sensor 14 switches the output from a predetermined off signal to a predetermined on signal. Also, when the state where the document exists is switched to the state where the document does not exist, that is, when the rear end of the document M reaches the position of the document end sensor 14, the document end sensor 14 switches the output from an on signal to an off signal. The leading end of the document M is an end, of the document M, facing downstream, and the rear end of the document M is an end, of the document M, facing upstream.

The positions of the transmitters 13a and the receiver 13b as the multi-feed sensor 13 in the transport path 33 and the position of the document end sensor 14 are not limited to the illustrated positions. For example, the multi-feed sensor 13 may be disposed at a position downstream of the second roller pair 12a2, 12b2 and upstream of the reading unit 15. Further, the document end sensor 14 may be provided at a position downstream of the first roller pair 12a1, 12b1 and upstream of the second roller pair 12a2, 12b2. Further, the multi-feed sensor 13 and the document end sensor 14 may be disposed at substantially the same position on the transport path 33.

2. Reading Control Process

Figure 3:
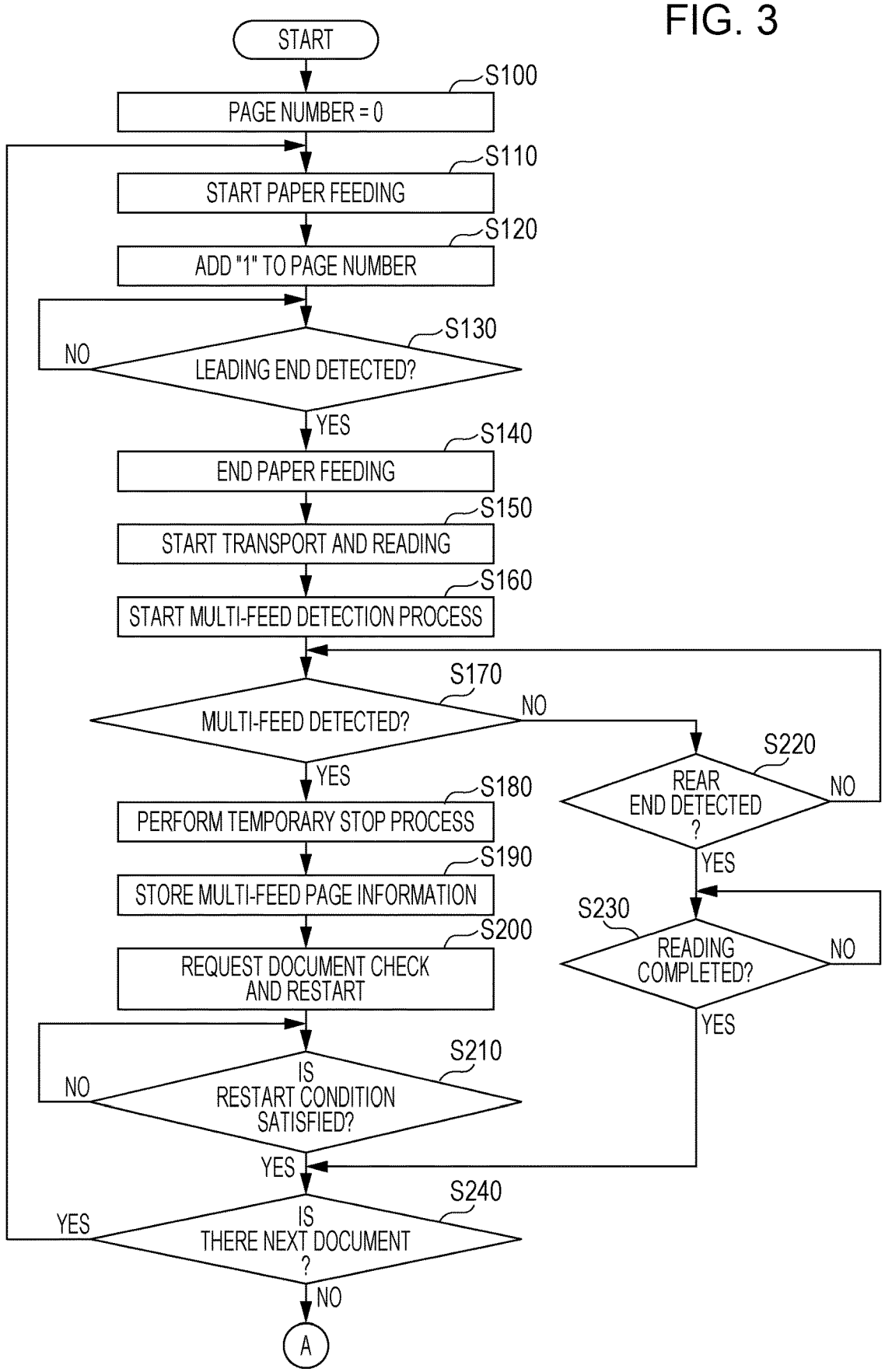
FIG. 3 is a flowchart showing part of a reading control process.
Figure 4:
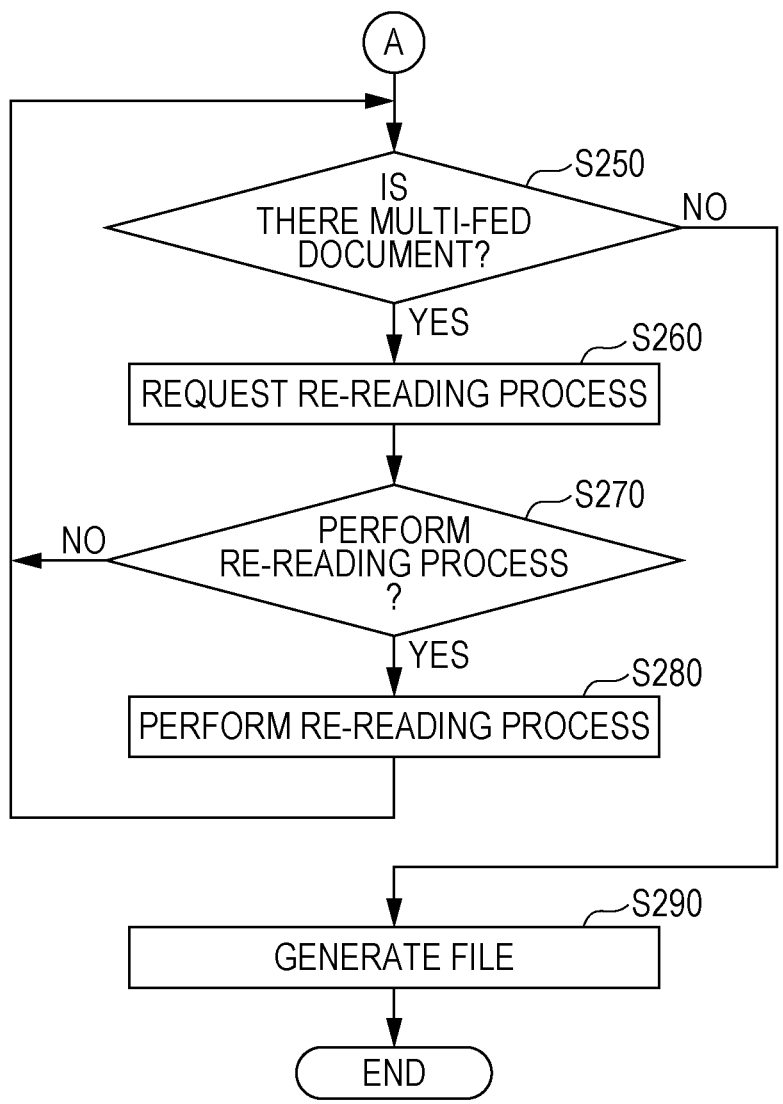
FIG. 4 is a flowchart showing the remaining part of the reading control process.

FIG. 3 and FIG. 4 are flowcharts showing a reading control process performed by the controller 11 according to the program 11e. The controller 11 starts the reading control process when receiving a scan start instruction from the outside. The scan start instruction is input to the reading apparatus 10 by the operation of the operation reception unit 16 performed by the user.

First, in step S100, the controller 11 initializes the page number, which is the current count value of the number of documents, to "0". Then, in step S110, the controller 11 instructs the transport unit 12 to feed the document M, thereby causing the transport unit 12 to start the paper feeding. The paper feeding is a type of transport, and is a process of sending the document M from the document tray 36 to a predetermined position immediately before the reading unit 15 is to read the document M. In step S110, the first roller pair 12a1, 12b1 starts rotating, the document M placed on the document tray 36 is taken into the transport path 33 and transported downstream. The controller 11 adds "1" to the current page number with the start of paper feeding in step S110 (step S120).

After the start of paper feeding, controller 11 repeatedly determines whether to have detected the leading end of the document M being fed (step S130). When detecting the leading end of the document M, the controller 11 makes the "Yes" determination in step S130 and advances the process to step S140. The controller 11 continuously inputs the output from the document end sensor 14, and determines that the leading end of the document M has been detected when the output from the document end sensor 14 is switched from the off signal to the on signal.

In step S140, the controller 11 ends the paper feeding. In other words, the transport until when the leading end of the document M reaches the position of the document end sensor 14 is the paper feeding. The controller 11 stops the rotation of the first roller pair 12a1, 12b1 when the paper feeding of the document M is completed. After feeding the document M, the controller 11 starts transporting and reading the document M (step S150). The transport started in step S150 is a transport for reading and discharging the document M, and is implemented by rotating the second roller pair 12a2, 12b2 and the third roller pair 12a3, 12b3.

It is not necessary to stop the document M between the paper feeding and the transport after the end of the paper feeding. Actually, the paper feeding of the document M and the transport after the end of the paper feeding are continuously performed. Further, the controller 11 does not need to cause the reading unit 15 to start reading at the same time when the paper feeding of the document M is completed. After the paper feeding is completed, the controller 11 may cause the reading unit 15 to start reading the document M after waiting for a known time required to transport the document M by a distance from the document end sensor 14 to the reading unit 15 along the transport path 33.

Following step S150, in step S160, the controller 11 starts a multi-feed detection process for the transport document. The multi-feed detection process corresponds to a multi-feed detection step. The "transport document" means the document M currently being transported by the transport unit 12. The controller 11 that has started the multi-feed detection process drives the transmitter 13a and the receiver 13b as the multi-feed sensor 13 and receives a detection signal output from the receiver 13b. The controller 11 compares the received detection signal with a predetermined threshold value for multi-feed detection to determine the detection result as a single-feed when the detection signal is equal to or greater than the threshold value, and to determine the detection result as a multi-feed when the detection signal is less than the threshold value. After step S160, such a multi-feed detection process is basically continuously performed until the multi-feed is detected or the rear end of the transport document is detected. The multi-feed sensor 13 and the controller 11 that detects the multi-feed or the single-feed based on a detection signal from the multi-feed sensor 13 correspond to a "multi-feed detection unit".

In step S170, the controller 11 branches the process depending on whether the multi-feed is detected. When detecting the multi-feed, the controller 11 advances the process to step S180 as a result of the "Yes" determination in step S170, and on the other hand, when detecting the single-feed, the controller 11 advances the process to step S220 as a result of the "No" determination in step S170.

In step S220, the controller 11 determines whether the rear end of the transport document has been detected. When detecting the rear end of the transport document, the controller 11 makes the "Yes" determination in step S220, and advances the process to step S230. On the other hand, when the rear end of the transport document is not detected, the controller 11 makes the "No" determination in step S220, and advances the process to step S170. The controller 11 determines that the rear end of the transport document has been detected when the output from the document end sensor 14 switches from the on signal to the off signal. After starting the multi-feed detection process in step S160, when the "Yes" determination is made in step S220 after the "No" determination in step S170, and the "No" determination in step S220 are repeated, it means that no multi-feed was detected for the transport document.

In step S230, the controller 11 repeatedly determines whether the reading of the transport document by the reading unit 15 is completed. When the reading of the transport document is completed, the controller 11 advances the process to step S240 as a result of the "Yes" determination in step S230. For example, the controller 11 may make the "Yes" determination in step S230 after waiting for a known time required for the rear end of the transport document to pass through the reading unit 15 after the document end sensor 14 detects the rear end.

On the other hand, in step S180, the controller 11 performs a temporary stop process. Specifically, the controller 11 causes the transport unit 12 to continue the transport of the transport document and eject the transport document from the discharge port 35, and then causes the transport unit 12 to stop the transport. In this case, the first roller pair 12$a$1, 12$b$1 has already stopped, and the second roller pair 12$a$2, 12$b$2 and the third roller pair 12$a$3, 12$b$3 are further stopped. According to the temporary stop process, the transport document for which the multi-feed is detected in step S170 is discharged downstream as it is, and thus is read by the reading unit 15. The temporary stop process of step S180 corresponds to a temporary stop step.

In step S190, the controller 11 stores the multi-fed page information indicating the page number of the document M for which the multi-feed is detected. That is, the controller 11 stores the current page number as the multi-fed page information in the predetermined memory. The multi-fed page information may be information that directly or indirectly indicates the page number of the document M for which the multi-feed is detected. Step S190 corresponds to a storing step. The controller 11 may perform step S190 in parallel with the temporary stop process of step S180.

In step S200, the controller 11 requests document check and restart. The document check request is to prompt the user to check the document M discharged by the temporary stop process. The restart request is to prompt the user to restart the process for the remaining documents. The "remaining documents" are documents M whose pages succeeds a page of the document M discharged by the temporary stop process, and specifically, the respective documents M remaining on the document tray 36. The controller 11 displays, on the display unit 17, the document check request and the restart request as visual information.

Figure 5A:
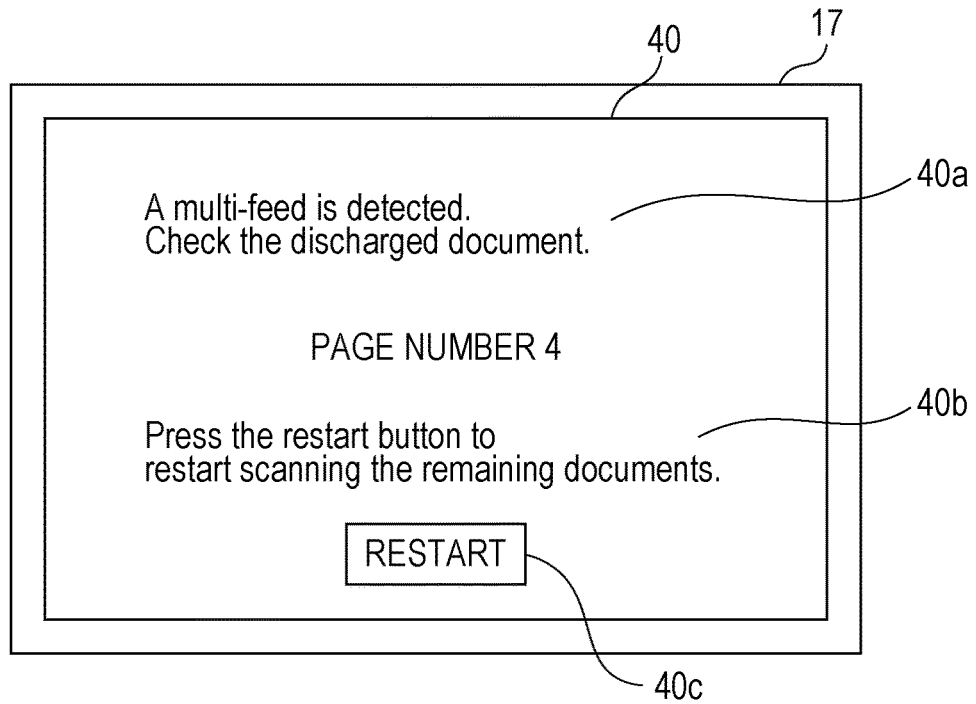
FIG. 5A is a diagram showing an example of a UI screen displayed in step S200.

FIG. 5A shows an example of a user interface (UI) screen 40 displayed on the display unit 17 by the controller 11 in step S200. For example, a message 40$a$, as a document check request, such as "A multi-feed is detected. Check the discharged document." is displayed in the UI screen 40. By visually recognizing the message 40$a$, the user can pick up the discharged document and check whether the multi-feed has actually occurred.

The current page number may also be displayed in the UI screen 40. In the example of FIG. 5A, "4" is shown as the page number. This means that the controller 11 counts, as the fourth document M, the document M for which the multi-feed is detected in step S170 and is discharged by the temporary stop process in step S180. Therefore, the user can recognize that the multi-feed has actually occurred when the number of the documents M that have been discharged from the discharge port 35 is larger than four at the current time.

In the UI screen 40, a message 40$b$, as a restart request, such as "Press the restart button to restart scanning the remaining documents" is displayed together with a restart button 40$c$. The user who visually recognizes the message 40$b$ inputs a restart instruction by performing an operation such as a touch or a click to depress the restart button 40$c$.

Subsequent to step S200, the controller 11 repeatedly determines whether the condition for restarting the process for the remaining documents is satisfied (step S210). When the condition for restarting the process for the remaining documents is satisfied, the controller 11 advances the process to step S240 as a result of the "Yes" determination in step S210. The controller 11 determines that the restart condition is satisfied when receiving the restart instruction by the operation of the restart button 40$c$.

In step S240, which is a step ahead of step S210 or step S230, the controller 11 determines the presence or absence of the next document M, and returns the process to step S110 as a result of the "Yes" determination when there is the next document M, while advancing the process to step S250 in FIG. 4 as a result of the "No" determination when there is no next document M. For example, a sensor (not shown) that detects the document M is mounted on the document tray 36, and the controller 11 may determine, based on the output signal from the sensor, the presence or absence of the document M in the document tray 36, that is, the presence or absence of the next document M.

In step S110, which is a step ahead of step S240, the paper feeding of the next document M is started. That is, the next document M is a new transport document, and the processes of step S110 and subsequent steps are performed. According to the flow of repeating step S110 and subsequent steps through steps S180 to S210, and S240, it can be said that the controller 11 performs the remaining document reading step of restarting the transport by the transport unit 12 after the temporary stop and causing the reading unit 15 to read the remaining documents.

The controller 11 may determine in step S210 that the restart condition is satisfied when a predetermined time has elapsed without operating the restart button 40$c$ with the UI screen 40 being displayed in step S200. In other words, when a predetermined time has elapsed without receiving a restart instruction after the temporary stop, the transport unit 12 and the reading unit 15 may be caused to transport and read the remaining documents.

For the sake of convenience, a process from step S100 to the "No" determination in step S240 is referred to as a "primary reading process". As a result of the primary reading process, the transport of all of the plurality of documents M placed on the document tray 36 is completed. The documents M transported in the primary reading process may include a document M that has been multi-fed together with another document M and has not been read by the reading unit 15. The end of the primary reading process corresponds to the end of the transporting and the reading of the remaining documents.

In step S250, the controller 11 branches the process depending on the presence or absence of the document M for which the multi-feed is detected. The document M for which the multi-feed is detected, that is, a document M that is determined as "Yes" in step S170 when the document M is a transport document, is referred to as a "multi-fed document". When there is no multi-fed document in the primary reading process, the controller 11 makes the "No" determination in step S250 to advance the process to step S290. In addition, the controller 11 makes the "No" determination in step S250 to advance the process to step S290 when there is any multi-fed document in the primary reading process, and the processes of step S260 and thereafter and subsequent steps has been performed on the any multi-fed document. When there is a multi-fed document in the primary reading process and there is a multi-fed document that is not subjected to the processes of step S260 and subsequent steps, the controller 11 makes the "Yes" determination in step S250 and advances the process to step S260.

In step S260, the controller 11 selects, as the target multi-fed document, the multi-fed document with the smallest page number among the multi-fed documents that are not subjected to the processes of step S260 and subsequent steps before the most recent step S250, and requests a re-reading process. For example, in the primary reading process, the controller 11 stores the page number "2" and the page number "4" as the multi-fed page information. In this case, the controller 11 selects, as the target multi-fed document, the multi-fed document with page number "2" and the multi-fed document with page number "4" in this order each time when step S260 is performed.

The "re-reading process" refers to a process of causing the transport unit 12 and the reading unit 15 to transport and read the document M that has been multi-fed, respectively. The documents M that has been multi-fed include the multi-fed document and the document M that has been multi-fed together with this multi-fed document. The request for the re-reading process, that is, the re-reading request is to prompt the user to start the re-reading process, and the controller 11 displays, on the display unit 17, the re-reading request as visual information.

Figure 5B:
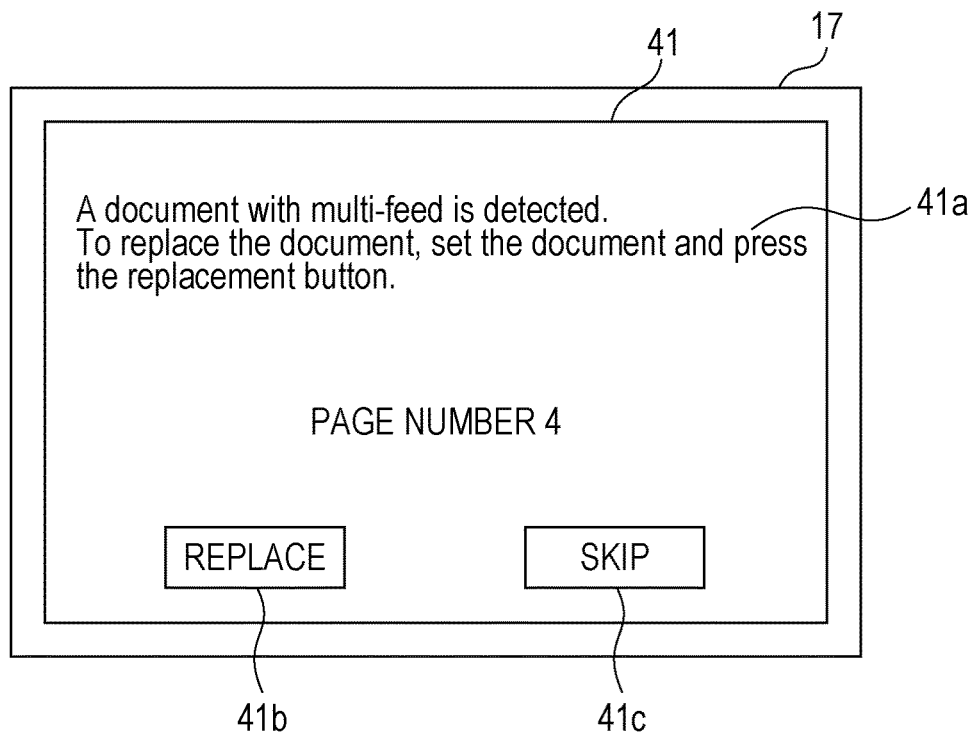
FIG. 5B is a diagram showing an example of a UI screen displayed in step S260.

FIG. 5B shows an example of a UI screen 41 displayed on the display unit 17 by the controller 11 in step S260. For example, a message 41a, as a re-reading request, such as "A document with a multi-feed is detected. To replace the document, set the document and press the replacement button." is displayed in the UI screen 41. Further, in the UI screen 41, a replacement button 41b and a skip button 41c are displayed. The page number of the target multi-fed document may also be displayed in the UI screen 41 as in the example of FIG. 5B. Furthermore, a reduced image of the target multi-fed document may be displayed in the UI screen 41. The reduced image of the target multi-fed document is a reduced version of the image data read and generated by the reading unit 15 in the process of being discharged by the temporary stop process (step S180) when this target multi-fed document is a transport document in the primary reading process.

In the example of FIG. 5B, "4" is shown as the page number. Therefore, the UI screen 41 of FIG. 5B is a screen for inquiring of the user whether to perform the re-reading process on the multi-fed document with the page number "4". When the user who visually recognizes the UI screen 41 performs the re-reading process on the multi-fed document with page number "4", the user places, on the document tray 36, one document M that has been discharged by the temporary stop process as a document M with page number "4", and another document M that has been fed and discharged together with the one document M, and then presses down the replacement button 41b. On the other hand, when the user does not perform the re-reading process on the multi-fed document with the page number "4", the user presses down the skip button 41c without placing the document M on the document tray 36.

In step S270, the controller 11 determines whether to perform the re-reading process on the target multi-fed document. That is, the controller 11 determines that the instruction to perform the re-reading process has been received when the replacement button 41b in the UI screen 41 has been operated, and advances the process to step S280 as a result of the "Yes" determination in step S270. On the other hand, the controller 11 determines that the instruction not to perform the re-reading process has been received when the skip button 41c in the UI screen 41 is operated, and advances the process to step S250 as a result of the "No" determination in step S270.

In step S280, the controller 11 performs the re-reading process on the target multi-fed document. That is, the controller 11 controls the transport unit 12 and the reading unit 15 to sequentially perform a paper feeding for respective documents M placed on the document tray 36, the transport after the paper feeding, the reading, and the discharging. After ending the re-reading process in step S280, the controller 11 advances the process to step S250. Step S280 corresponds to a re-reading step. Further, the re-reading process may be referred to as a secondary reading process in correspondence with the expression of the primary reading process. As can be seen from FIGS. 3 and 4, the controller 11 repeats step S260 for each of the multi-fed documents, and displays the re-reading request for each of the multi-fed documents when a plurality of documents M is detected as the multi-fed documents at the time of ending the transporting and the reading of the remaining documents ("No" in step S240).

In step S290, the controller 11 generates an image file in a predetermined format from the image data acquired by the primary reading process and the re-reading process. The format of the image file is, for example, the PDF format, but is not limited to the PDF format. The image data mentioned here is image data on a page-by-page basis generated by the reading unit 15 that reads the documents M on a page-by-page basis. Further, such image data is also referred to as read data. The file generation in step S290 includes an insertion step of inserting, based on the multi-fed page information, the second read data acquired by the reading in the re-reading process into the first read data acquired by the reading that is completed before the re-reading process, that is, by the primary reading process. When step S280 has never been performed, no second read data exists, so that the first read data for a plurality of pages is an image file as it is. Here, the description will be continued assuming that step S280 has been performed at least once.

Figure 6:
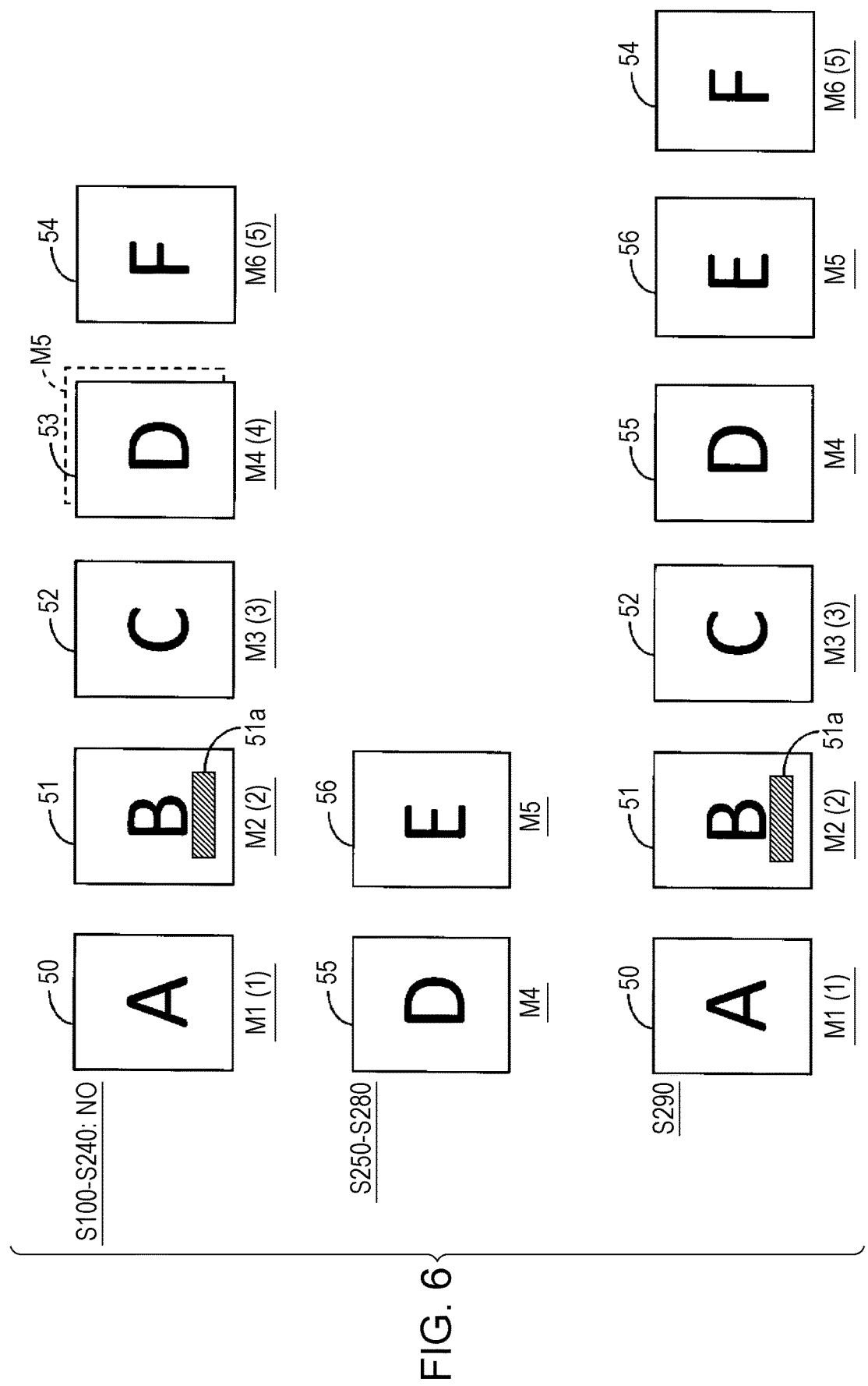
FIG. 6 is a diagram showing a specific example of a process until an insertion step is performed in step S290.

FIG. 6 shows, using a specific example, the flow until when the insertion step is performed in the file generation in step S290 by the reading control process. In FIG. 6, respective solid line rectangles indicated by reference numerals 50, 51, 52, 53, 54, 55, and 56 represent read data page-by-page basis. Further, "M & number" described in association with the read data 50 to 56 indicates which document M the document M from which the read data is generated is. For example, the read data 51 is represented as a result in which the reading unit 15 reads the document M2 whose transport order is the second when among the six documents M placed on the document tray 36 before the start of the reading control process, all of them are single-fed. The alphabets A, B, C, D, E, and F written inside the read data 50 to 56 simply represent contents that are printed on the documents M1, M2, M3, M4, M5, and M6.

The read data 50 to 54 shown in the upper part of FIG. 6 correspond to the first read data acquired by the primary reading process. On the other hand, read data 55 and 56 shown in the middle part of FIG. 6 correspond to the second read data acquired by the re-reading process. In addition, in FIG. 6, the number in parentheses next to "M & number" written in association with the read data 50 to 54 represents the page number given to each of the documents M1, M2, M3, M4, M6 in step S120 in the primary reading process. The document M5 indicated by a broken line so as to overlap with the document M4 indicates a document that has been multi-fed together with the document M4.

That is, in the example of FIG. 6, since the document M5 as well as the document M4 have been multi-fed in the primary reading process until when the "No" determination is made in step S240, the multi-feed is detected in step S170 when the document M4 is a transport document, and the document M4 is a target of the temporary stop process (step S180), whereby its page number "4" is stored as the multi-fed page information (step S190). Therefore, in the primary reading process, while the read data 53 of the document M4 is acquired, the document M5 is not read and is discharged together with the document M4. Also, in this primary reading process, since the document M4 and the document M5 have been multi-fed, the document M6, which should have been originally transported as the sixth document, is transported as the document with page number "5" to generate the read data 54.

A partial area 51a shown by hatching the inside of the read data 51 indicates the result of the reading unit 15 reading the label or the sticky note attached to the document M2 together with the document M2. The presence of such a label, sticky note, or the like that cannot be regarded as an actual multi-feed may be detected as a multi-feed in the multi-feed detection process. For this reason, in the primary reading process illustrated in FIG. 6, the multi-feed is detected in step S170 when the document M2 is a transport document, and the document M2 is a target of the temporary stop process (step S180), whereby its page number "2" is stored as the multi-fed page information (step S190).

According to the example of FIG. 6, the document M2 with the page number "2" and the document M4 with the page number "4" are the multi-fed documents, and the controller 11 makes the re-reading request in step S260 that the respective multi-fed documents be re-read. It is assumed that the user makes an instruction not to perform the re-reading process on the document M2 with page number "2" ("No" in step S270) in response to the re-reading request, and makes an instruction to perform the re-reading process on the document M4 with the page number "4" ("Yes" in step S270) in response to the re-reading request. As a result, the document M4 and the document M5 which are placed on the document tray 36 again by the user are subjected to the re-reading process in step S280 to acquire the read data 55 of the document M4 and the read data 56 of the document M5.

According to the example of FIG. 6, the controller 11 performs the re-reading process on the multi-fed document with the page number "4" of the page numbers "2" and "4" stored as the multi-fed page information. For this reason, in step S290, the controller 11 replaces, among the first read data (read data 50 to 54) acquired by the primary reading process, the read data 53 corresponding to the page number "4" that is subjected to the re-reading process with the second read data (the read data 55 and 56) acquired by the re-reading process. The controller 11 discards the read data 53 that is the first read data replaced with the second read data. According to such a replacement, the second read data is inserted into the first read data, and as shown in the lower part of FIG. 6, the controller 11 can generate an image file composed of the read data 50, 51, 52, 55, 56, and 54 which represent the correct reading result corresponding to the order of the documents M1, M2, M3, M4, M5, and M6.

The read data 53 as the first read data and the read data 55 as the second read data are the read result of the same document M4. For this reason, in step S290, the controller 11 does not discard the read data 53, and may insert the read data 56 as the second read data between the read data 53 and the read data 54 in the first read data based on the page number "4" stored as the multi-fed page information.

The controller 11 performs the file generation in step S290, and ends the flowchart of the reading control process. Of course, the controller 11 may store the generated image file in a predetermined memory, print the generated image file, or transfer the generated image file to the external device 20 via the communication IF 18.

3. Summary

Thus, according to the present embodiment, the reading apparatus 10 includes the transport unit 12 that transports the document M along the transport path 33, the multi-feed detection unit that detects a multi-feed of the document M being transported by the transport unit 12, the reading unit 15 that reads the document M being transported by the transport unit 12, and the controller 11 that controls the transport unit 12 and the reading unit 15. When the multi-feed of the document M is detected by the multi-feed detection unit, the controller 11 causes the transport unit 12 to discharge, downstream of the transport path 33, the document M for which the multi-feed is detected and then causes the transport unit 12 to temporarily stop the transport, stores multi-fed page information indicating a page number of the document M for which the multi-fed is detected, causes the transport unit 12 to restart the transport after the temporary stop, and after the reading unit 15 reads a remaining document whose page succeeds a page of the document M for which the multi-fed is detected, causes the transport unit 12 and the reading unit 15 to perform a re-reading process including the transporting and the reading of the multi-fed document, respectively, and inserts, based on the multi-fed page information, second read data acquired by the reading in the re-reading process into first read data acquired by the reading completed before the re-reading process.

According to the above configuration, when the multi-feed of the document M is detected, the controller 11 discharges, downstream of the transport path 33, the document M for which the multi-feed is detected, and then temporarily stops the transport to restart the transporting and the reading of the remaining documents after the temporary stop. Therefore, it is possible to give the user an opportunity to immediately check the document M for which the multi-feed is detected while minimizing a reduction in the efficiency of the entire reading process for the plurality of documents M. Further, according to the above configuration, the controller 11 performs the re-reading process on the multi-fed document M after the reading of the remaining documents is completed, and inserts the read data based on the multi-fed page information. Therefore, even when the multi-feed occurs, it is possible to finally provide the user with correct reading results regarding the plurality of documents M.

According to the flowchart of FIG. 3, the controller 11 determines in step S240 that the next document exists, and then advances the process to step S110 to start feeding the next document M. Therefore, when the multi-fed document is discharged by the temporary stop process in step S180, the document M does not exist in the transport path 33. However, in the present embodiment, the paper feeding of the next document M may already have started when the temporary stop process of step S180 is performed. For example, the controller 11 starts feeding the next document M at a timing when the transporting and the reading of the document M after feeding the document M are performed to a predetermined extent. In such a configuration, in the temporary stop process of step S180, the controller 11 immediately stops the first roller pair 12a1, 12b1, while driving the second roller pair 12a2, 12b2 and the third roller pair 12*a*3, 12*b*3 for a period necessary for discharging the multi-fed document and then stopping the second roller pair and third roller pair. When making the "Yes" determination in step S210, the controller 11 may restart the paper feeding of the next document M that is temporarily stopped.

Further, according to the present embodiment, the controller 11 displays, on the predetermined display unit 17, a check request for prompting the user to check the discharged document M with the temporary stop. According to the above configuration, the user can easily check, at the timing when the transport is temporarily stopped in the middle of the sequence transport of the plurality of documents M, whether the document M for which the multi-feed is detected is actually multi-fed.

Further, according to the present embodiment, the controller 11 displays, on the display unit 17, a restart request for prompting the user to restart the reading of the remaining document with the temporary stop, and causes the transport unit 12 and the reading unit 15 to perform the transporting and the reading of the remaining document, respectively, when receiving a restart instruction for the restart request. According to the above configuration, by leaving control of the timing of releasing the temporary stop to the user, the user can check the discharged document M with much time to spare.

Further, according to the present embodiment, the controller 11 may cause the transport unit 12 and the reading unit 15 to perform the transporting and the reading of the remaining document, respectively, when a predetermined time passes without receiving the restart instruction after the temporary stop. According to the above configuration, after the temporary stop, the controller 11 restarts the process for the remaining documents when the restart instruction is not input for a certain period of time because, for example, the user does not stay near the reading apparatus 10 and cannot check the discharged document M. As a result, a situation in which the reading apparatus 10 continues to be occupied by the reading control process while the reading control process for the plurality of documents M is interrupted.

Further, according to the present embodiment, the controller 11 displays, on the display unit 17, a re-reading request for prompting a user to start the re-reading process after the transporting and the reading of the remaining document are completed, and causes the transport unit 12 and the reading unit 15 to perform the re-reading process when receiving an instruction to perform the re-reading request. According to the above configuration, it is possible to start the re-reading process based on the user's intention.

Further, according to the present embodiment, in a case where the multi-feed detection unit detects a multi-feed of each of a plurality of the documents when the transporting and the reading of the remaining documents are completed, the controller 11 repeatedly displays, on the display unit 17, the re-reading request for each of the documents M for which the multi-feed is detected. According to the above configuration, the user can determine the necessity of the re-reading process to perform instruction to the reading apparatus 10 for each of the documents M for which the multi-feed is detected and that is discharged by the temporary stop process.

The present embodiment discloses a method performed by the reading apparatus 10, the program 11*e* that implements this method in cooperation with hardware, and a memory that stores the program 11*e*. The reading control method by the reading apparatus 10 including the transport unit 12 that transports the document M along the transport path 33, and the reading unit 15 that reads the document M being transported by the transport unit 12 includes a multi-feed detection step of detecting a multi-feed of the document M being transported by the transport unit 12, a temporary stop step of, when the multi-feed of the document M is detected by the multi-feed detection step, causing the transport unit 12 to discharge, downstream of the transport path 33, the document M for which the multi-feed is detected and then causing the transport unit 12 to temporarily stop the transport, a storing step of storing multi-fed page information indicating a page number of the document M for which the multi-fed is detected, a remaining document reading step of causing the transfer unit 12 to restart the transporting after the temporary stop, and causing the reading unit 15 to read a remaining document whose page succeeds a page of the document M for which the multi-feed is detected, a re-reading step of causing the transport unit 12 and the reading unit 15 to perform the transporting and the reading of the multi-fed document M, respectively, after the remaining document reading step is completed, and an insertion step of inserting, based on the multi-fed page information, second read data acquired by the reading in the re-reading step into first read data acquired by the reading completed before the re-reading step.

The external device 20 may perform at least part of the process described so far as being performed by the reading apparatus 10. For example, the UI may be provided by the display unit or the operation reception unit included in the external device 20, and the user may input respective instructions to the reading apparatus 10 through the UI provided by the external device 20. The external device 20 notifies the reading apparatus 10 of the instruction received from the user. The UI screens 40 and 41 illustrated in FIGS. 5A and 5B may be displayed on the display unit included in the external device 20. The reading apparatus may be a system including a plurality of devices communicatively connected to each other. That is, the reading control method of the present embodiment may be implemented by a system including the reading apparatus 10 and the external device 20. In this case, the application installed in the external device 20 controls the reading apparatus 10 to implement at least part of the flowcharts of FIGS. 3 and 4. For example, the external device 20 may be in charge of generating the file in step S290.

What is claimed is:

1. A reading apparatus comprising:
 a transport unit that transports a document along a transport path;
 a multi-feed detection unit that detects a multi-feed of the document being transported by the transport unit;
 a reading unit that reads the document being transported by the transport unit; and
 a controller that controls the transport unit and the reading unit, wherein
 when the multi-feed of the document is detected by the multi-feed detection unit, the controller
 causes the transport unit to discharge, downstream of the transport path, the document for which the multi-feed is detected and then causes the transport unit to temporarily stop the transport,
 stores multi-feed page information indicating a page number of the document for which the multi-feed is detected,
 causes the transport unit to restart the transport after the temporary stop,
 after the reading unit reads a remaining document whose page succeeds a page of the document for which the multi-feed is detected, causes the transport unit and the reading unit to perform a re-reading process including the transporting and the reading of the multi-feed document, respectively, and inserts, based on the multi-feed page information, second read data acquired by the reading in the re-reading process into first read data acquired by the reading completed before the re-reading process.

2. The reading apparatus according to claim 1, wherein the controller displays, on a predetermined display unit, a check request for prompting a user to check the discharged document with the temporary stop.

3. The reading apparatus according to claim 2, wherein the controller displays, on the predetermined display unit, a restart request for prompting the user to restart the reading of the remaining document with the temporary stop, and causes the transport unit and the reading unit to perform the transporting and the reading of the remaining document, respectively, when receiving a restart instruction for the restart request.

4. The reading apparatus according to claim 3, wherein the controller causes the transport unit and the reading unit to perform the transporting and the reading of the remaining document, respectively, when a predetermined time passes without receiving the restart instruction after the temporary stop.

5. The reading apparatus according to claim 2, wherein the controller displays, on the predetermined display unit, a re-reading request for prompting the user to start the re-reading process after the transporting and the reading of the remaining document are completed, and causes the transport unit and the reading unit to perform the re-reading process when receiving an instruction to perform the re-reading request.

6. The reading apparatus according to claim 5, wherein in a case where the multi-feed detection unit detects a multi-feed of each of a plurality of documents when transporting and reading of remaining documents are completed, the controller repeatedly displays, on the predetermined display unit, the re-reading request for each of the plurality of documents for which the multi-feed is detected.

7. A reading control method by a reading apparatus including a transport unit that transports a document along a transport path, and a reading unit that reads the document being transported by the transport unit, the reading control method comprising:

a multi-feed detection step of detecting a multi-feed of the document being transported by the transport unit;

a temporary stop step of, when the multi-feed of the document is detected by the multi-feed detection step, causing the transport unit to discharge, downstream of the transport path, the document for which the multi-feed is detected and then causing the transport unit to temporarily stop the transport;

a storing step of storing multi-feed page information indicating a page number of the document for which the multi-feed is detected;

a remaining document reading step of causing a transfer unit to restart the transporting after the temporary stop, and causing the reading unit to read a remaining document whose page succeeds a page of the document for which the multi-feed is detected;

a re-reading step of causing the transport unit and the reading unit to perform the transporting and the reading of the multi-feed document, respectively, after the remaining document reading step is completed; and an insertion step of inserting, based on the multi-feed page information, second read data acquired by the reading in the re-reading step into first read data acquired by the reading completed before the re-reading step.

* * * * *